United States Patent
Jiang et al.

(10) Patent No.: US 11,372,146 B2
(45) Date of Patent: Jun. 28, 2022

(54) METHOD AND DEVICE FOR REAL-TIME ATTITUDE ANGLE MEASUREMENT BASED ON FIELD OF VIEW EFFECT OF BIREFRINGENT CRYSTAL

(71) Applicant: HUAZHONG UNIVERSITY OF SCIENCE AND TECHNOLOGY, Hubei (CN)

(72) Inventors: Hao Jiang, Hubei (CN); Song Zhang, Hubei (CN); Honggang Gu, Hubei (CN); Shiyuan Liu, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 175 days.

(21) Appl. No.: 17/008,663

(22) Filed: Sep. 1, 2020

(65) Prior Publication Data
US 2021/0302640 A1    Sep. 30, 2021

(30) Foreign Application Priority Data
Mar. 25, 2020  (CN) .......................... 202010219763.0

(51) Int. Cl.
*G02B 5/30* (2006.01)
*G01B 11/00* (2006.01)

(52) U.S. Cl.
CPC .......... *G02B 5/3083* (2013.01); *G01B 11/005* (2013.01)

(58) Field of Classification Search
CPC ........................... G02B 5/3083; G01B 11/005
See application file for complete search history.

(56) References Cited

U.S. PATENT DOCUMENTS

2014/0267942 A1*  9/2014  Hayashibe .......... G02F 1/13363
                                                  359/489.02

\* cited by examiner

*Primary Examiner* — Lucy P Chien
(74) *Attorney, Agent, or Firm* — JCIPRNET

(57) ABSTRACT

A method and a device for real-time attitude angle measurement based on the field of view effect of the birefringent crystal are provided. The device includes a high-speed polarization measurement module and an object attitude adjustment module connected to each other. The high-speed polarization measurement module includes a polarizer unit and a real-time polarization analyzer unit, respectively located on two opposite sides of the object attitude adjustment module. The object attitude adjustment module includes an attitude angle controller, a roll angle adjustment unit, a pitch angle adjustment unit, a yaw angle adjustment unit, and a height adjustment unit respectively connected to the attitude angle controller, and a birefringent crystal. The method includes an algorithm for real-time extraction of object attitude angle according to optical parameters measured by the high-speed polarization measurement module, and a method for compensating attitude angle measurement errors.

12 Claims, 1 Drawing Sheet

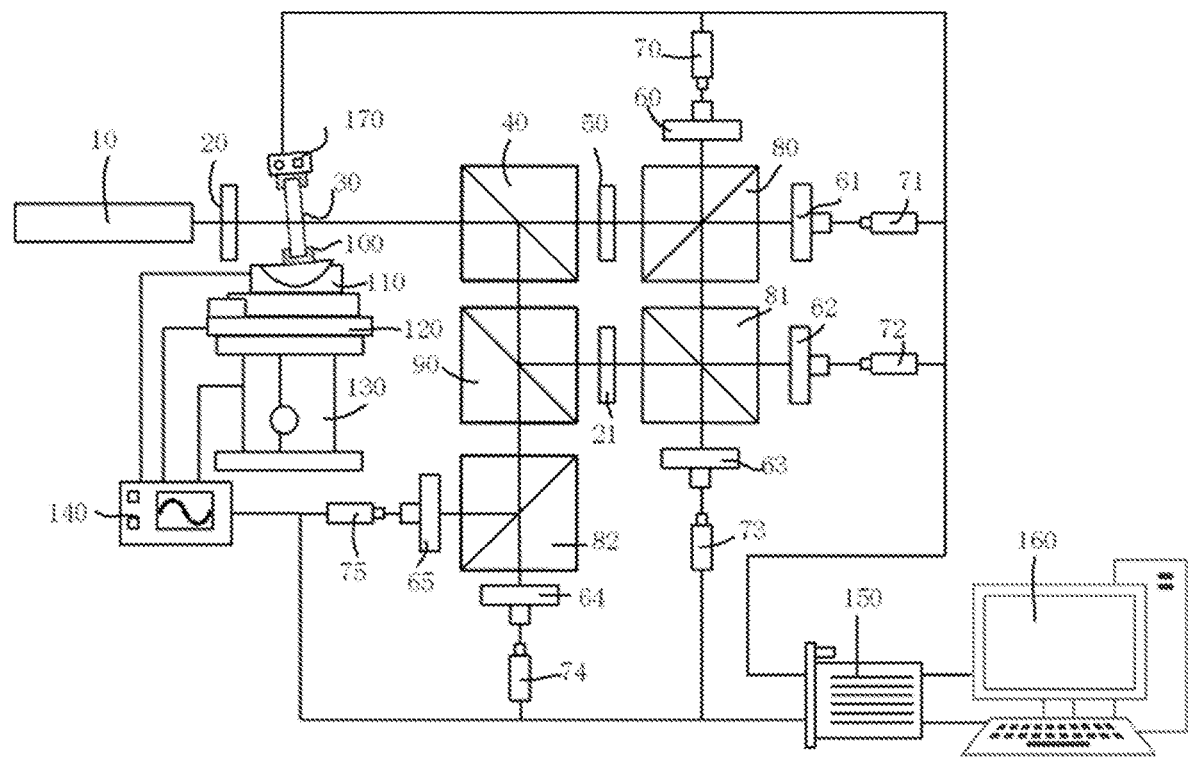

METHOD AND DEVICE FOR REAL-TIME ATTITUDE ANGLE MEASUREMENT BASED ON FIELD OF VIEW EFFECT OF BIREFRINGENT CRYSTAL

CROSS-REFERENCE TO RELATED APPLICATION

This application claims the priority benefit of China application serial no. 202010219763.0, filed on Mar. 25, 2020. The entirety of the above-mentioned patent application is hereby incorporated by reference herein and made a part of this specification.

BACKGROUND

Technical Field

The disclosure relates to the technical field of optical measurement, and more specifically relates to a method and a device for real-time attitude angle measurement based on the field of view effect of the birefringent crystal.

Description of Related Art

The attitude angle is an important parameter describing the motion of an object and is usually composed of a yaw angle φ, a pitch angle θ, and a roll angle ϕ. In the fields of precision manufacturing, robot control, aircraft navigation, etc., it is very important to accurately measure the real-time attitude angle in a large range. Traditional methods for attitude angle measurement require the integration of information measured by multiple sensors to implement full attitude angle measurement. Conventional attitude angle sensors include a gyroscope, an accelerometer, etc. Since the gyroscope measures the angular velocity instead of the angle, it is necessary to consider issues such as integration errors when using the gyroscope to obtain the attitude angle, while the accelerometer is susceptible to the influence of vibration. Therefore, in order to accurately measure the attitude angle of an object, the measurement systems often need to be equipped with multiple gyroscopes and accelerometers, which will increase the cost of the entire system and also increase the complexity of the system.

In recent years, due to the advantages of non-contact, flexible system, low cost, high precision, high sensitivity, etc., the optical measurement methods have great potential in attitude angle measurement. Currently, the optical-based attitude angle measurement methods include the following: the first kind of method is the roll angle measurement method based on the polarization effect of the magnetic garnet single crystal, which can measure the roll angle over a larger range; the second kind of method is a fiber Bragg grating strain sensor based on multi-core fibers, which can measure the attitude angle of an object within the direction of a roll angle of ±2° and a pitch angle of ±15°; and the last kind of method is a method based on laser self-collimation, which can implement attitude angle measurement with a resolution of 0.01 arc second and an accuracy of 0.5 arc second, but the measurement range is only 60 arc seconds. The existing optical-based attitude angle measurement methods, on one hand, cannot implement real-time full attitude angle measurement, and on the other hand, the measurement range of the attitude angle is too small. Correspondingly, there is an urgent need in the art to propose a device and a method capable of real-time and in-situ full attitude angle measurement over a large range.

SUMMARY

In view of the above defects or improvement requirements of the prior art, the disclosure provides a method and a device for real-time attitude angle measurement based on the field of view effect of the birefringent crystal, which combines the measurement requirements of in-situ, real-time, large-range, and high-precision attitude angle measurement. Correspondingly, a device and a method capable of measuring and extracting the attitude angle of an object under any attitude are designed. The main components of the device include an attitude adjustment module that can adjust the attitude of the object over a large range, and a high-speed polarization real-time measurement module that can measure the in-situ and real-time attitude change of the object. At the same time, combined with the optical characterization model of the Mueller matrix of the birefringent crystal in the case of oblique incidence, the optical parameter extraction algorithm of the birefringent crystal under the special measurement configuration, and the corresponding relationship between the field of view and the attitude angle, the large-range, in-situ, real-time, and high-precision attitude angle measurement of the object attached with the birefringent crystal under any attitude may be completed. In addition, combined with the attitude angle measured at any moment, the angular velocity and angular acceleration of each attitude angle can also be obtained. Also, the disclosure can be applied to attitude angle measurement of various objects, and the measurement method is not only limited to transmissive measurement, but also applicable to reflective measurement.

To achieve the above objectives, according to one aspect of the disclosure, a device for real-time attitude angle measurement based on the field of view effect of the birefringent crystal is provided. The device includes a high-speed polarization measurement module and an object attitude adjustment module connected to each other. The real-time polarization measurement module includes a polarizer unit and a real-time polarization analyzer unit. The polarizer unit and the real-time polarization analyzer unit are respectively located on two opposite sides of the object attitude adjustment module. The high-speed polarization measurement module is installed on a rotating baseplate. The rotating baseplate is configured to adjust the incidence angle of the high-speed polarization measurement module, so as to implement reflective and transmissive mode measurements.

The object attitude adjustment module includes a roll angle adjustment unit, a pitch angle adjustment unit, a yaw angle adjustment unit, a height adjustment unit, an attitude angle controller, a pitch angle real-time measurement unit, and a birefringent crystal. The pitch angle adjustment unit, the yaw angle adjustment unit, and the height adjustment unit are respectively connected to the attitude angle controller. The roll angle adjustment unit is disposed on the pitch angle adjustment unit. The pitch angle adjustment unit is disposed on the yaw angle adjustment unit. The yaw angle adjustment unit is disposed on the height adjustment unit. The roll angle adjustment unit is configured to carry an object and the birefringent crystal. The birefringent crystal and the pitch angle real-time measurement unit are attached to the object during operation.

The height adjustment unit is configured to adjust the height of the object, so that light can pass through the center of the birefringent crystal. The yaw angle adjustment unit is configured to adjust the yaw angle of the object. The pitch angle adjustment unit is configured to adjust the pitch angle of the object. The roll angle adjustment unit is configured to adjust the roll angle of the object. The attitude angle controller is configured to simultaneously perform continuous closed-loop control of each adjustment unit of the object attitude adjustment module in real time and generate a related trigger signal.

Further, the attitude angle adjustment module can adjust the attitude of the object within the range of a roll angle of 0° to 360°, and an oblique angle and a yaw angle of −90° to 90°.

Further, the polarizer unit includes a polarization laser source and a first achromatic quarter-wave plate, which can output polarized light of any polarization state. The high-speed polarization measurement module is installed on the rotating baseplate. The rotating baseplate is configured to adjust the incidence angle of the high-speed polarization measurement module, so as to implement reflective and transmissive mode measurements.

Further, the polarized light output by the polarizer unit passes through the birefringent crystal attached to the object and then enters the real-time polarization analyzer unit, thereby obtaining the optical parameters of the birefringent crystal that changes with the attitude of the object. At the same time, combined with the relationship between the optical parameters of the birefringent crystal and the attitude angle of the object, the attitude angle of the object in real time may be obtained.

Further, the pitch angle real-time measurement unit is connected to the attitude angle controller. The pitch angle real-time measurement unit is configured to measure the pitch angle of the object in real time, and perform real-time synchronous measurement with the high-speed polarization measurement module through the trigger signal output by the attitude angle controller.

According to another aspect of the disclosure, a method for real-time attitude angle measurement based on the field of view effect of the birefringent crystal is provided. The real-time measurement method includes the following steps.

(1) The device for real-time attitude angle measurement based on the field of view effect of the birefringent crystal is provided. A light path of the device for real-time measurement is aligned. The polarizer unit is adjusted without placing the object to be measured, so that the polarizer unit outputs a circularly polarized light.

(2) The object attached with the birefringent crystal is placed in the roll angle adjustment unit. The attitude angle controller is turned on to control the attitude of the object in real time. At the same time, the attitude angle controller sends the trigger signal to the real-time polarization analyzer unit and the pitch angle real-time measurement unit, thereby performing real-time data acquisition of an attitude changing process.

(3) According to the light intensity acquired in Step (2), a Stokes' vector $S_{out}$ of the polarized light passing through the birefringent crystal is solved through the real-time polarization analyzer unit.

(4) An optical characterization model of the birefringent crystal under oblique incidence is established. Combined the optical characterization model of the birefringent crystal under oblique incidence with the Stokes' vector $S_{out}$ of the outgoing polarized light obtained in Step (3), a retardation $\delta$ and an azimuth $\phi$ of the birefringent crystal under oblique incidence are extracted.

(5) The relationship of the change of the retardation of the birefringent crystal $\delta(\beta, \phi_2)$ and the field of view under different fields of view is established.

(6) The optical parameters of the birefringent crystal extracted in Step (4) and the relationship of the change of the retardation of the birefringent crystal $\delta(\beta, \phi)$ and the field of view in Step (5) are combined to extract the fields of view of the birefringent crystal at different times.

(7) The relationship between the field of view and the attitude angle of the object is established. The field of view obtained in Step (6) and the pitch angle in Step (2) are combined to calculate the attitude angle of the object in real time.

Further, the angular velocity ω and the angular acceleration α corresponding to each attitude angle are obtained through calculating the change of the attitude angle of the object with time.

Further, in Step (1), first, a difference of 45° is kept between the direction of the linearly polarized light output by the polarization laser source of the polarizer unit and the azimuth of the first achromatic quarter-wave plate of the polarizer unit. Then, the polarization laser source and the first achromatic quarter-wave plate are simultaneously rotated with the same increment $N_m$ times. A measured Stokes' vector $S^m$ and a calculated Stokes' vector $S^c$ are compared. Through a minimum error calibration formula $\chi^2$, a relative angle deviation $\Delta\theta_{cir}$ and a wave plate retardation deviation $\Delta\delta_{cir}$ are obtained. Finally, through compensating the relative angle deviation $\Delta\theta_{cir}$ and the wave plate retardation deviation $\Delta\delta_{cir}$, the circularly polarized light output is obtained.

$$\chi^2 = \sum_{q=1}^{N_m} \sum_{p=0}^{3} \left[ \frac{S_{q,p}^m - S_{q,p}^c(\Delta\theta_{cir}, \Delta\delta_{cir})}{\sigma(S_{q,p})} \right]^2.$$

Where, $N_m$ is the total number of incremental measurements, the superscript "m" represents the result of measurement, the superscript "c" represents the result of theoretical calculation, the subscripts "q,p" represent the $p^{th}$ Stokes' parameter in q measurements, and $\sigma(S_{q,p})$ is the standard deviation of the measured Stokes' vector.

Furthermore, the relationship of the change of the retardation of the birefringent crystal $\delta(\beta, \phi)$ and the field of view is:

$$\delta(\beta, \Phi) = \frac{2\pi}{\lambda}L = \frac{2\pi}{\lambda}\sum_{i=1}^{n} d_i\left(\sqrt{n_{y_i}^2 - \sin^2\beta} - \sqrt{n_{z_i}^2 - \sin^2\beta}\right).$$

Where, the birefringent crystal used is composed of a single piece or a plurality of pieces; $d_i$ is the thickness of the $i^{th}$ birefringent crystal, $n_{yi}$ and $n_{zi}$ are the effective refractive indices in the crystal corresponding to the coordinate system axis thereof, $\lambda$ is the wavelength of the output light of the light source used; and $\beta$ is the incidence angle.

Further, the relationship between the field of view and the attitude angle of the object is: the azimuth in the field of view is equal to the roll angle in the attitude angle, and the incidence angle $\beta$ in the field of view has the following relationship with the oblique angle and the yaw angle $\varphi$, $$\cos\beta = \cos\theta \cos\varphi$$

Where, $\theta$ is the pitch angle.

In general, compared with the prior art through the above technical solution conceived by the disclosure, the method and the device for real-time attitude angle measurement based on the field of view effect of the birefringent crystal provided by the disclosure mainly has the following beneficial effects:

1. The disclosure can implement the full attitude angle measurement within an extremely large attitude angle change direction as a benefit of the field of view effect of the birefringent crystal and the extremely large attitude angle adjustment range of the attitude adjustment module, which can perform accurate measurements within the range of the roll angle of 0° to 360°, and within the direction of the pitch angle and the yaw angle of −90° to 90°.

2. The birefringent crystal used in the disclosure may be conventional quartz, calcite, etc., which is cheap and easy to acquire. At the same time, such birefringent crystal has stable optical properties, which is convenient for standardization and calibration of attitude angle measurement while the thickness, material, and combination of the birefringent crystal may also be optimized for different measurement requirements.

3. The disclosure combines the advantages of high-precision, high-sensitivity, high-resolution time measurement, etc. of the high-speed polarization measurement method, which can implement the in-situ and real-time high-precision measurement and extraction of the attitude angle. In addition, the angular velocity and the angular acceleration of each attitude angle may also be extracted.

4. The disclosure is applicable to attitude angle measurements of various objects. The measurement method is not limited to transmissive measurement, but also applicable to reflective measurement.

5. The proposed device has a simple structure, is easy to debug, and has great scalability, which can be configured and optimized in combination with different measurement objects.

BRIEF DESCRIPTION OF THE DRAWINGS

FIG. 1 is a schematic diagram of a device for real-time attitude angle measurement based on the field of view effect of the birefringent crystal provided by the disclosure.

In all the drawings, the same reference numerals are used to denote the same elements or structures, where: 10—polarization laser source, 20—first achromatic quarter-wave plate, 21—second achromatic quarter-wave plate, 30—birefringent crystal, 40—70:30 non-polarizing beam splitter, 50—achromatic half-wave plate, 60—first large-caliber fiber collimator, 61—second large-caliber fiber collimator, 62—third large-caliber fiber collimator, 63—fourth large-caliber fiber collimator, 64—fifth large-caliber optical fiber collimator, 65—sixth large-caliber fiber collimator, 70—first high-response frequency photomultiplier tube, 71—second high-response frequency photomultiplier tube, 72—third high-response frequency photomultiplier tube, 73—fourth high-response frequency photomultiplier tube, 74—fifth high-response frequency photomultiplier tube, 75—sixth high-response frequency photomultiplier tube, 80—first polarizing beam splitter, 81—second polarizing beam splitter, 82—third polarizing beam splitter, 90—50:50 non-polarizing beam splitter, 100—roll angle adjustment unit, 110—pitch angle adjustment unit, 120—yaw angle adjustment unit, 130—height adjustment unit, 140—attitude angle controller, 150—height acquisition card, 160—microprocessor, and 170—pitch angle real-time measurement unit.

DETAILED DESCRIPTION OF DISCLOSED EMBODIMENTS

In order to make the objectives, technical solutions, and advantages of the disclosure clearer, the disclosure is further described in detail below with reference to the accompanying drawings and embodiments. It should be understood that the specific embodiments described here are only used to explain the disclosure, but not to limit the disclosure. In addition, the technical features involved in the embodiments of the disclosure described below may be combined with each other as long as there is no conflict therebetween.

Please refer to FIG. 1. The disclosure provides a device for real-time attitude angle measurement based on the field of view effect of the birefringent crystal. The real-time measurement device includes a high-speed polarization measurement module and an object attitude adjustment module. The high-speed polarization measurement module includes a polarizer unit and a real-time polarization analyzer unit. The polarizer unit and the real-time polarization analyzer unit are respectively located on two opposite sides of the object attitude adjustment module, are both installed on a rotating baseplate, and may be applied to both transmissive measurement and reflective measurement.

The polarizer unit includes a polarization laser source 10 and a first achromatic quarter-wave plate 20. The real-time polarization analyzer unit includes a second achromatic quarter-wave plate 21, a 70:30 non-polarizing beam splitter 40, a 50:50 non-polarizing beam splitter 90, a first polarizing beam splitter 80, a second polarizing beam splitter 81, a third polarizing beam splitter 82, an achromatic half-wave plate 50, a first large-caliber fiber collimator 60, a second large-caliber fiber collimator 61, a third large-caliber fiber collimator 62, a fourth large-caliber fiber collimator 63, a fifth large-caliber fiber collimator 64, a sixth large-caliber fiber collimator 65, a first high-response frequency photomultiplier tube 70, a second high-response frequency photomultiplier tube 71, a third high-response frequency photomultiplier tube 72, a fourth high-response frequency photomultiplier tube 73, a fifth high-response frequency photomultiplier tube 74, a sixth high-response frequency photomultiplier tube 75, a high-speed acquisition card 150, and a microprocessor 160.

In the embodiment, the polarization laser source 10, the first achromatic quarter-wave plate 20, the 70:30 non-polarizing beam splitter 40, the achromatic half-wave plate 50, the first polarizing beam splitter 80, the second large-caliber fiber collimator 61, and the second high-response frequency photomultiplier tube 71 are sequentially disposed at intervals along the same horizontal direction. The 50:50 non-polarizing beam splitter 90 and the second polarizing beam splitter 81 are respectively located below the 70:30 non-polarizing beam splitter 40 and the first polarizing beam splitter 80. The 50:50 non-polarizing beam splitter 90, the second achromatic quarter-wave plate 21, the second polarizing beam splitter 81, the third large-caliber fiber collimator 62, and the third high-response frequency photomultiplier tube 72 are sequentially disposed at intervals along the same horizontal direction. An output end of the second polarizing beam splitter 81 is connected to the high-speed acquisition card 150 sequentially through the fourth large-caliber fiber collimator 63 and the fourth high-response frequency photomultiplier tube 73. An output end of the third polarizing beam splitter 82 is connected to the high-speed acquisition card 150 sequentially through the fifth large-caliber fiber collimator 64 and the fifth high-response frequency photomultiplier 74, and the other output end of the third polarizing beam splitter 82 is connected to the high-speed acquisition card 150 sequentially through the sixth large-caliber fiber collimator 65 and the sixth high-response frequency photomultiplier tube 75. An output end of the first polarizing beam splitter 80 is connected to the high-speed acquisition card 150 sequentially through the first large-caliber fiber collimator 60 and the first high-response frequency photomultiplier 70. The second high-response frequency photomultiplier tube 71 and the third high-response frequency photomultiplier tube 72 are respectively connected to the high-speed acquisition card 150. The high-speed acquisition card 150 is connected to the microprocessor 160.

In the polarizer unit, the output polarization wavelength of the polarization laser source 10 may be optimized according to the specific optical properties of the birefringent crystal 30 and the measurement range of the attitude angle. The polarization laser source 10 and the first achromatic quarter-wave plate 20 are disposed on the rotating baseplate. The polarization state of the output polarized light may be adjusted through adjusting the polarization laser source 10 and the azimuth of the first achromatic quarter-wave plate 20.

In the real-time polarization analyzer unit, the 70:30 non-polarizing beam splitter 40 and the 50:50 non-polarizing beam splitter 90 divide the incident polarized light onto the real-time polarization analyzer unit into three beams with equal light intensity. The three beams are respectively collected by the fifth large-caliber fiber collimator 64, the sixth large-caliber fiber collimator 65, the third large-caliber fiber collimator 62, the fourth large-caliber fiber collimator 63, the second large-caliber fiber collimator 61, and the first large-caliber fiber collimator 60 after respectively passing through the three sets of analyzer combinations of the third polarizing beam splitter 82, the second achromatic quarter-wave plate 21 and the second polarizing beam splitter 81, and the achromatic half-wave plate 50 and the first polarizing beam splitter 80, which are transmitted to the first high-response frequency photomultiplier tube 70, the second high-response frequency photomultiplier tube 71, the third high-response frequency photomultiplier tube 72, the fourth high-response frequency photomultiplier tube 73, the fifth high-response frequency photomultiplier tube 74, and the sixth high-response frequency photomultiplier tube 75 through fibers, are then synchronously transmitted to the high-speed acquisition card 150, and are then transmitted to the microprocessor 160 via the high-speed acquisition card 150. The microprocessor 160 processes the received data to obtain the Stokes' vector of the polarized light input to the real-time polarization analyzer unit.

In the embodiment, the azimuths of the achromatic half-wave plate 50 and the second achromatic quarter-wave plate 21 may be optimized for different measurement objects to improve the stability and noise resistance of the system. At the same time, the first large-caliber fiber collimator 60, the second large-caliber fiber collimator 61, the third large-caliber fiber collimator 62, the fourth large-caliber fiber collimator 63, the fifth large-caliber fiber collimator 64, and the sixth large-caliber fiber collimator 65 may also cope with the case of a larger light deviation caused by the change of the attitude angle of the object.

The object attitude adjustment module includes a roll angle adjustment unit 100, a pitch angle adjustment unit 110, a yaw angle adjustment unit 120, a height adjustment unit 130, an attitude angle controller 140, a birefringent crystal 30, and a pitch angle real-time measurement unit 170. The pitch angle real-time measurement unit 170, the pitch angle adjustment unit 110, the yaw angle adjustment unit 120, and the height adjustment unit 130 are respectively connected to the attitude angle controller 140. The roll angle adjustment unit 100 is disposed on the pitch angle adjustment unit 110. The pitch angle adjustment unit 110 is disposed on the yaw angle adjustment unit 120. The yaw angle adjustment unit 120 is disposed on the height adjustment unit 130. The roll angle adjustment unit 100 is configured to carry an object and the birefringent crystal 30. The birefringent crystal 30 and the pitch angle real-time measurement unit 170 are attached to the object during operation.

The height adjustment unit 130 is configured to adjust the height of the object, so that light can pass through the center of the birefringent crystal 30. The yaw angle adjustment unit 120 is configured to adjust the yaw angle of the object. The pitch angle adjustment unit 110 is configured to adjust the pitch angle of the object. The roll angle adjustment unit 100 is configured to adjust the roll angle of the object. The object attached with the birefringent crystal 30 is installed in the roll angle adjustment unit 100 through an adapter device. The attitude angle controller 140 is configured to generate various control signals and trigger signals, and is connected to all adjustment units through a data line. The pitch angle real-time measurement unit 170 is configured to measure the pitch angle of the object in real time and transmit to the attitude angle controller 140. The attitude angle controller 140 is connected to the high-speed polarization measurement module, so that the pitch angle real-time measurement unit 170 and the high-speed polarization measurement module may perform real-time synchronous measurement. The attitude angle controller 140 can simultaneously perform continuous closed-loop control of each adjustment unit in real time, and the attitude angle adjustment module can adjust the attitude of the object within the range of the roll angle of 0° to 360°, and the oblique angle and the yaw angle of −90° to 90°.

The disclosure also provides a method for real-time attitude angle measurement based on the field of view effect of the birefringent crystal. The real-time measurement method mainly includes the following steps.

Step 1: After aligning the optical path of the device for real-time attitude angle measurement, the first achromatic quarter-wave plate 20 is rotated without placing the object to be measured, so that the polarizer unit outputs a circularly polarized light.

Specifically, in order to reduce the attitude angle measurement error caused by the incidence of undesirable circularly polarized light, first, a difference of 45° is kept between the direction of the linearly polarized light output by the polarization laser source 10 and the azimuth of the first achromatic quarter-wave plate 20. Then, the polarization laser source 10 and the first achromatic quarter-wave plate 20 are simultaneously rotated with the same increment $N_m$ times. A measured Stokes' vector $S^m$ and a calculated Stokes' vector $S^c$ are compared. Through a minimum error calibration formula $\chi^2$, a relative angle deviation $\Delta\theta_{cir}$ and a wave plate retardation deviation $\Delta\delta_{cir}$ are obtained. Finally, through compensating the relative angle deviation $\Delta\theta_{cir}$ and the wave plate retardation deviation $\Delta\delta_{cir}$, a more ideal circularly polarized light output is obtained.

$$\chi^2 = \sum_{q=1}^{N_m} \sum_{p=0}^{3} \left[ \frac{S_{q,p}^m - S_{q,p}^c(\Delta\theta_{cir}, \Delta\delta_{cir})}{\sigma(S_{q,p})} \right]^2.$$

Where, $N_m$ is the total number of incremental measurements, the superscript "m" represents the result of measurement, the superscript "c" represents the result of theoretical calculation, the subscripts "q,p" represent the $p^{th}$ Stokes' parameter in q measurements, and $\sigma(S_{q,p})$ is the standard deviation of the measured Stokes' vector.

Step 2: The object attached with the birefringent crystal 30 is placed in the roll angle adjustment unit 100. The attitude angle control unit 140 is turned on to control the attitude of the object in real time while the attitude angle controller 140 outputs a trigger signal to the high-speed acquisition card 150. The high-speed acquisition card 150 performs attitude acquisition on an attitude changing process. In addition, a pitch angle θ(t) of the object may be synchronously acquired in real time through the pitch angle real-time measurement unit 170.

Step 3: According to the light intensity acquired in Step 2, a light intensity matrix B may be obtained. Combined with an analyzer matrix A of the real-time polarization analyzer unit, a Stokes' vector $S_{out}$ of the polarized light passing through the birefringent crystal 30 may be solved.

$$S_{out} = (A^T A)^{-1} A^T B.$$

Step 4: An optical characterization model of the birefringent crystal 30 under oblique incidence is established. The birefringent crystal 30 with both linear birefringence (LB) property and circular birefringence (CB) property under oblique incidence may be expressed in the form of Muller matrix by a rotation angle γ, an azimuth φ, and a retardation δ.

$$M_{WP}(\phi, \delta, \gamma) = M_{LB}(\phi, \delta) \cdot M_{CB}(\gamma).$$

Here, $M_{LB}$ is the Muller matrix of the device with LB property:

$$M_{LB} = \begin{pmatrix} 1 & 0 & 0 & 0 \\ 0 & \cos(4\Phi)\sin(\delta/2)^2 + \cos(\delta/2)^2 & \sin(4\Phi)\sin(\delta/2)^2 & -\sin(2\Phi)\sin(\delta) \\ 0 & -\sin(4\Phi)\sin(\delta/2)^2 & -\cos(4\Phi)\sin(\delta/2)^2 + \cos(\delta/2)^2 & \cos(2\Phi)\sin(\delta) \\ 0 & \sin(2\Phi)\sin(\delta) & \cos(2\Phi)\sin(\delta) & \cos(\delta) \end{pmatrix}$$

Here, $M_{CB}$ is the Muller matrix of the device with CB property:

$$M_{CB} = \begin{pmatrix} 1 & 0 & 0 & 0 \\ 0 & \cos(2\gamma) & \sin(2\gamma) & 0 \\ 0 & -\sin(2\gamma) & \cos(2\gamma) & 0 \\ 0 & 0 & 0 & 1 \end{pmatrix}$$

Therefore, the Stokes' vector $S_{out}$ of the polarized light passing through the birefringent crystal 30 may also be calculated theoretically.

$$S_{out} = M_{WP} \cdot [1\ 0\ 0\ 1]^T = [1\ \sin(2\phi)\sin(\delta)\ \cos(2\phi)\sin(\delta)\ \cos(\delta)]^T.$$

Combined the optical characterization model of the birefringent crystal under oblique incidence with the Stokes' vector $S_{out}$ of the outgoing polarized light obtained in Step 3, optical parameters such as the retardation δ and the azimuth φ of the birefringent crystal 30 under oblique incidence are extracted.

$$\delta = \arccos[S_{out}(3)];\ \text{and}$$

$$\phi = \arcsin[S_{out}(2)/\sin(\delta)]/2\ \text{or}\ \phi = \arccos[S_{out}(3)/\sin(\delta)]/2.$$

Step 5: The relationship of the change of the retardation of the birefringent crystal 30 δ(β, 100) and the field of view under different fields of view (incidence angle β and azimuth φ) is established.

$$\delta(\beta, \Phi) = \frac{2\pi}{\lambda} L = \frac{2\pi}{\lambda} \sum_{i=1}^{n} d_i \left( \sqrt{n_{y_i}^2 - \sin^2 \beta} - \sqrt{n_{z_i}^2 - \sin^2 \beta} \right).$$

Where, the birefringent crystal 30 used is composed of a single piece or multiple pieces. $d_i$ is the thickness of the $i^{th}$ birefringent crystal, $n_{yi}$ and $n_{zi}$ are the effective refractive indices in the crystal corresponding to the coordinate system axis thereof, and λ is the wavelength of the output light of the polarization laser source 10 used.

Step 6: The optical parameters δ and φ of the birefringent crystal extracted in Step 4 and the relationship of the change of the retardation of the birefringent crystal δ(β, φ) and the field of view established in Step 5 are combined to extract the incidence angle β(t) of the birefringent crystals at different times.

Step 7: The relationship between the field of view and the attitude angle of the object attached with the birefringent crystal is established. The azimuth φ in the field of view is equal to the roll angle φ in the attitude angle. The incidence angle β in the field of view and the oblique angle θ and the yaw angle φ have the following relationship, $$\cos\beta = \cos\theta \cos\varphi.$$

Combined with the field of view β(t) obtained in Step 6 and the pitch angle θ(t) obtained in Step 2, the yaw angle φ(t) of the object at different times may be calculated, $$\varphi(t) = \arccos\left[\frac{\cos\beta(t)}{\cos\theta(t)}\right].$$

So far, all the attitude angles θ(t), φ(t), and φ(t) at any moment have been obtained.

In addition, through calculating the information of the change of the attitude angle of the object over time, the angular velocity co and the angular acceleration α of the change of the attitude angle may also be obtained. Taking the roll angle as an example, the calculation formula is as follows, $$\omega_\Phi(t) = \frac{\Phi(t + \Delta t) - \Phi(t)}{\Delta t}$$

$$a_\Phi(t) = \frac{\omega_\Phi(t + \Delta t) - \omega_\Phi(t)}{\Delta t}$$

In general, the disclosure has the following beneficial results. The measurement device and the measurement method of the disclosure benefit from the field of view effect of the birefringence and the extremely large attitude angle adjustment range of the attitude adjustment module, and the high precision, and the advantages of high-precision, high-sensitivity, high-resolution time measurement, etc. of the high-speed polarization measurement method, which can implement the in-situ and real-time accurate measurement of the full attitude angle within the extremely large range of attitude angle changes such as the roll angle of 0° to 360°, and the pitch angle and the yaw angle of −90° to 90°. In addition, combined with the information of the attitude angle changing with time, the angular velocity and angular acceleration of each attitude angle may also be extracted.

The birefringent crystal used in the disclosure may be conventional quartz, calcite, etc., which is cheap and easy to obtain. At the same time, such birefringent crystal has stable optical properties, which provides convenience for standardization and calibration of attitude angle measurement. The thickness, material, and combination of the birefringent crystal may also be optimized for different measurement requirements. The disclosure is applicable to attitude angle measurements of various objects. The measurement method is not limited to transmissive measurement, but also applicable to reflective measurement. The measurement device proposed by the disclosure has a simple structure, is easy to debug, and has great scalability, which can be configured and optimized in combination with different measurement objects.

Those skilled in the art can easily understand that the above are preferred embodiments of the disclosure and are not intended to limit the disclosure. Any modification, equivalent replacement, improvement, etc. made within the spirit and principle of the disclosure should be included in the protection scope of the disclosure.

What is claimed is:

1. A device for real-time attitude angle measurement based on a field of view effect of a birefringent crystal, wherein:
the device for real-time attitude angle measurement comprises a high-speed polarization measurement module and an object attitude adjustment module connected to each other; the real-time polarization measurement module comprises a polarizer unit and a real-time polarization analyzer unit; the polarizer unit and the real-time polarization analyzer unit are respectively located on two opposite sides of the object attitude adjustment module, the high-speed polarization measurement module is installed on a rotating baseplate, and the rotating baseplate is configured to adjust an incidence angle of the high-speed polarization measurement module, so as to implement reflective and transmissive mode measurements;
the object attitude adjustment module comprises a roll angle adjustment unit, a pitch angle adjustment unit, a yaw angle adjustment unit, a height adjustment unit, an attitude angle controller, a pitch angle real-time measurement unit, and a birefringent crystal, the pitch angle adjustment unit, the yaw angle adjustment unit, and the height adjustment unit are respectively connected to the attitude angle controller, the roll angle adjustment unit is disposed on the pitch angle adjustment unit, the pitch angle adjustment unit is disposed on the yaw angle adjustment unit, the yaw angle adjustment unit is disposed on the height adjustment unit; the roll angle adjustment unit is configured to carry an object and the birefringent crystal, and the birefringent crystal and the pitch angle real-time measurement unit are attached to the object during operation; and
the height adjustment unit is configured to adjust a height of the object, so that light passes through a center of the birefringent crystal; the yaw angle adjustment unit is configured to adjust a yaw angle of the object; the pitch angle adjustment unit is configured to adjust a pitch angle of the object; the roll angle adjustment unit is configured to adjust a roll angle of the object; and the attitude angle controller is configured to simultaneously perform continuous closed-loop control of each adjustment unit of the object attitude adjustment module in real time and generate a trigger signal.

2. The device for real-time attitude angle measurement based on the field of view effect of the birefringent crystal according to claim 1, wherein the attitude angle adjustment module adjusts an attitude of the object within a range of a roll angle of 0° to 360°, and an oblique angle and a yaw angle of −90° to 90°.

3. The device for real-time attitude angle measurement based on the field of view effect of the birefringent crystal according to claim 1, wherein a polarized light output by the polarizer unit passes through the birefringent crystal attached to the object and then enters the real-time polarization analyzer unit, thereby obtaining optical parameters of the birefringent crystal that changes with the attitude of the object; at the same time, combined with a relationship between the optical parameters of the birefringent crystal and an attitude angle of the object, the attitude angle of the object in real time is obtained.

4. The device for real-time attitude angle measurement based on the field of view effect of the birefringent crystal according to claim 1, wherein the pitch angle real-time measurement unit is connected to the attitude angle controller, the pitch angle real-time measurement unit is configured to measure the pitch angle of the object in real time, and perform real-time synchronous measurement with the high-speed polarization measurement module through the trigger signal output by the attitude angle controller.

5. A method for real-time attitude angle measurement based on a field of view effect of a birefringent crystal, comprising:
Step (1): providing the device for real-time attitude angle measurement based on the field of view effect of the birefringent crystal according to claim 1, aligning a light path of the device for real-time attitude angle measurement, and adjusting the polarizer unit without placing the object, so that the polarizer unit outputs a circularly polarized light;
Step (2): placing the object attached with the birefringent crystal in the roll angle adjustment unit, turning on the attitude angle controller to control the attitude of the object in real time, and sending the trigger signal to the real-time polarization analyzer unit and the pitch angle real-time measurement unit by the attitude angle controller at the same time, thereby performing real-time data acquisition of an attitude changing process;
Step (3): solving a Stokes' vector $S_{out}$ of the polarized light passing through the birefringent crystal through the real-time polarization analyzer unit according to a light intensity acquired in Step (2);
Step (4): establishing an optical characterization model of the birefringent crystal under oblique incidence, and combined the optical characterization model of the birefringent crystal under oblique incidence with the Stokes' vector $S_{out}$ of an outgoing polarized light obtained in Step (3) to extract a retardation $\delta$ and an azimuth $\varphi$ of the birefringent crystal under oblique incidence;
Step (5): establishing a relationship of the change of the retardation of the birefringent crystal $\delta(\beta, \varphi)$ and a field of view under different fields of view;

Step (6): combining the optical parameters of the birefringent crystal extracted in Step (4) and the relationship of the change of the retardation of the birefringent crystal $\delta(\beta, \phi)$ and the field of view in Step (5) to extract the fields of view of the birefringent crystal at different times; and Step (7): establishing a relationship between the field of view and the attitude angle of the object, and combining the field of view obtained in Step (6) and the pitch angle in Step (2) to calculate the attitude angle of the object in real time.

6. A method for real-time attitude angle measurement based on a field of view effect of a birefringent crystal, comprising:

Step (1): providing the device for real-time attitude angle measurement based on the field of view effect of the birefringent crystal according to claim 2, aligning a light path of the device for real-time attitude angle measurement, and adjusting the polarizer unit without placing the object, so that the polarizer unit outputs a circularly polarized light;

Step (2): placing the object attached with the birefringent crystal in the roll angle adjustment unit, turning on the attitude angle controller to control the attitude of the object in real time, and sending the trigger signal to the real-time polarization analyzer unit and the pitch angle real-time measurement unit by the attitude angle controller at the same time, thereby performing real-time data acquisition of an attitude changing process;

Step (3): solving a Stokes' vector $S_{out}$ of the polarized light passing through the birefringent crystal through the real-time polarization analyzer unit according to a light intensity acquired in Step (2);

Step (4): establishing an optical characterization model of the birefringent crystal under oblique incidence, and combined the optical characterization model of the birefringent crystal under oblique incidence with the Stokes' vector $S_{out}$ of an outgoing polarized light obtained in Step (3) to extract a retardation $\delta$ and an azimuth $\phi$ of the birefringent crystal under oblique incidence;

Step (5): establishing a relationship of the change of the retardation of the birefringent crystal $\delta(\beta, \phi)$ and a field of view under different fields of view;

Step (6): combining the optical parameters of the birefringent crystal extracted in Step (4) and the relationship of the change of the retardation of the birefringent crystal $\delta(\beta, \phi)$ and the field of view in Step (5) to extract the fields of view of the birefringent crystal at different times; and Step (7): establishing a relationship between the field of view and the attitude angle of the object, and combining the field of view obtained in Step (6) and the pitch angle in Step (2) to calculate the attitude angle of the object in real time.

7. A method for real-time attitude angle measurement based on a field of view effect of a birefringent crystal, comprising:

Step (1): providing the device for real-time attitude angle measurement based on the field of view effect of the birefringent crystal according to claim 3, aligning a light path of the device for real-time attitude angle measurement, and adjusting the polarizer unit without placing the object, so that the polarizer unit outputs a circularly polarized light;

Step (2): placing the object attached with the birefringent crystal in the roll angle adjustment unit, turning on the attitude angle controller to control the attitude of the object in real time, and sending the trigger signal to the real-time polarization analyzer unit and the pitch angle real-time measurement unit by the attitude angle controller at the same time, thereby performing real-time data acquisition of an attitude changing process;

Step (3): solving a Stokes' vector $S_{out}$ of the polarized light passing through the birefringent crystal through the real-time polarization analyzer unit according to a light intensity acquired in Step (2);

Step (4): establishing an optical characterization model of the birefringent crystal under oblique incidence, and combined the optical characterization model of the birefringent crystal under oblique incidence with the Stokes' vector $S_{out}$ of an outgoing polarized light obtained in Step (3) to extract a retardation $\delta$ and an azimuth $\phi$ of the birefringent crystal under oblique incidence;

Step (5): establishing a relationship of the change of the retardation of the birefringent crystal $\delta(\beta, \phi)$ and a field of view under different fields of view;

Step (6): combining the optical parameters of the birefringent crystal extracted in Step (4) and the relationship of the change of the retardation of the birefringent crystal $\delta(\beta, \phi)$ and the field of view in Step (5) to extract the fields of view of the birefringent crystal at different times; and Step (7): establishing a relationship between the field of view and the attitude angle of the object, and combining the field of view obtained in Step (6) and the pitch angle in Step (2) to calculate the attitude angle of the object in real time.

8. A method for real-time attitude angle measurement based on a field of view effect of a birefringent crystal, comprising:

Step (1): providing the device for real-time attitude angle measurement based on the field of view effect of the birefringent crystal according to claim 4, aligning a light path of the device for real-time attitude angle measurement, and adjusting the polarizer unit without placing the object, so that the polarizer unit outputs a circularly polarized light;

Step (2): placing the object attached with the birefringent crystal in the roll angle adjustment unit, turning on the attitude angle controller to control the attitude of the object in real time, and sending the trigger signal to the real-time polarization analyzer unit and the pitch angle real-time measurement unit by the attitude angle controller at the same time, thereby performing real-time data acquisition of an attitude changing process;

Step (3): solving a Stokes' vector $S_{out}$ of the polarized light passing through the birefringent crystal through the real-time polarization analyzer unit according to a light intensity acquired in Step (2);

Step (4): establishing an optical characterization model of the birefringent crystal under oblique incidence, and combined the optical characterization model of the birefringent crystal under oblique incidence with the Stokes' vector $S_{out}$ of an outgoing polarized light obtained in Step (3) to extract a retardation $\delta$ and an azimuth $\phi$ of the birefringent crystal under oblique incidence;

Step (5): establishing a relationship of the change of the retardation of the birefringent crystal $\delta(\beta, \phi)$ and a field of view under different fields of view;

Step (6): combining the optical parameters of the birefringent crystal extracted in Step (4) and the relationship of the change of the retardation of the birefringent crystal $\delta(\beta, \phi)$ and the field of view in Step (5) to extract the fields of view of the birefringent crystal at different times; and Step (7): establishing a relationship between the field of view and the attitude angle of the object, and combining the field of view obtained in Step (6) and the pitch angle in Step (2) to calculate the attitude angle of the object in real time.

9. The method for real-time attitude angle measurement based on the field of view effect of the birefringent crystal according to claim 5, wherein an angular velocity ω and an angular acceleration α corresponding to each attitude angle are obtained through calculating a change of the attitude angle of the object with time.

10. The method for real-time attitude angle measurement based on the field of view effect of the birefringent crystal according to claim 5, wherein: in Step (1), first, a difference of 45° is kept between a direction of a linearly polarized light output by a polarization laser source of the polarizer unit and an azimuth of a first achromatic quarter-wave plate of the polarizer unit; then, the polarization laser source and the first achromatic quarter-wave plate are simultaneously rotated with same increment $N_m$ times; a measured Stokes' vector $S^m$ and a calculated Stokes' vector $S^c$ are compared, through a minimum error calibration formula $\chi^2$, a relative angle deviation $\Delta\theta_{cir}$ and a wave plate retardation deviation $\Delta\delta_{cir}$ are obtained; and finally, through compensating the relative angle deviation $\Delta\theta_{cir}$ and the wave plate retardation deviation $\Delta\delta_{cir}$, the circularly polarized light output is obtained; wherein $$\chi^2 = \sum_{q=1}^{N_m} \sum_{p=0}^{3} \left[ \frac{S_{q,p}^m - S_{q,p}^c(\Delta\theta_{cir}, \Delta\delta_{cir})}{\sigma(S_{q,p})} \right]^2$$

where, $N_m$ is a total number of incremental measurements, a superscript "m" represents a result of measurement, a superscript "c" represents a result of theoretical calculation, subscripts "q,p" represent a $p^{th}$ Stokes' parameter in q measurements, and $\sigma(S_{q,p})$ is a standard deviation of the measured Stokes' vector.

11. The method for real-time attitude angle measurement based on the field of view effect of the birefringent crystal according to claim 5, wherein the relationship of the change of the retardation of the birefringent crystal $\delta(\beta, \phi)$ and the field of view is:

$$\delta(\beta, \Phi) = \frac{2\pi}{\lambda}L = \frac{2\pi}{\lambda}\sum_{i=1}^{n} d_i \left( \sqrt{n_{y_i}^2 - \sin^2\beta} - \sqrt{n_{z_i}^2 - \sin^2\beta} \right)$$

where, the birefringent crystal used is composed of a single piece or a plurality of pieces; $d_i$ is a thickness of an $i^{th}$ birefringent crystal, $n_{yi}$ and $n_{zi}$ are effective refractive indices in the birefringent crystal corresponding to a coordinate system axis thereof, $\lambda$ is a wavelength of an output light of a light source used; and $\beta$ is an incidence angle.

12. The method for real-time attitude angle measurement based on the field of view effect of the birefringent crystal according to claim 5, wherein the relationship between the field of view and the attitude angle of the object is: the azimuth in the field of view is equal to the roll angle in the attitude angle, and an incidence angle $\beta$ in the field of view has a following relationship with the oblique angle and a yaw angle φ, cos β=cos θ cos φ where, θ is the pitch angle.

\* \* \* \* \*